(12) United States Patent
Kushner et al.

(10) Patent No.: US 11,227,610 B1
(45) Date of Patent: Jan. 18, 2022

(54) COMPUTER-BASED SYSTEMS FOR ADMINISTERING PATTERNED PASSPHRASES

(71) Applicant: Wells Fargo Bank, N.A., San Francisco, CA (US)

(72) Inventors: Kristine Ing Kushner, Orinda, CA (US); John T. Wright, Benicia, CA (US)

(73) Assignee: Wells Fargo Bank, P.A., San Francisco, CA (US)

( * ) Notice: Subject to any disclaimer, the term of this patent is extended or adjusted under 35 U.S.C. 154(b) by 135 days.

(21) Appl. No.: 16/385,975

(22) Filed: Apr. 16, 2019

(51) Int. Cl.
*G10L 17/24* (2013.01)
*G10L 17/06* (2013.01)
*G10L 17/00* (2013.01)

(52) U.S. Cl.
CPC ............. *G10L 17/24* (2013.01); *G10L 17/00* (2013.01); *G10L 17/06* (2013.01)

(58) Field of Classification Search
CPC ......... G10L 15/00; G10L 15/02; G10L 15/06; G10L 15/08; G10L 2015/227; G10L 15/25; G10L 17/00; G10L 17/06; G10L 17/24
See application file for complete search history.

(56) References Cited

U.S. PATENT DOCUMENTS

| | | | |
|---|---|---|---|
| 6,941,269 B1 * | 9/2005 | Cohen | G10L 13/00 704/275 |
| 8,416,998 B2 | 4/2013 | Ichikawa et al. | |
| 9,159,321 B2 | 10/2015 | Cheung et al. | |
| 9,754,193 B2 | 9/2017 | Ramachandrula et al. | |
| 10,282,526 B2 * | 5/2019 | Nichols | G06F 21/31 |

(Continued)

FOREIGN PATENT DOCUMENTS

| | | |
|---|---|---|
| CN | 102298443 A | 12/2011 |
| CN | 104200146 A | 12/2014 |

OTHER PUBLICATIONS

Yeung, "Hong Kong researchers develop lip-reading password to foil imposters," South China Morning Post, updated Mar. 7, 2017, 2 pp.

(Continued)

*Primary Examiner* — Pierre Louis Desir
*Assistant Examiner* — Nicole A K Schmieder
(74) *Attorney, Agent, or Firm* — Shumaker & Sieffert, P.A.

(57) ABSTRACT

This disclosure describes computer-based techniques for administering a spoken patterned passphrase. A passphrase processing unit running on an administrator computer generates passphrase data for a secure system using acoustic data and video data representing a spoken phrase by a speaker. This passphrase includes a pattern of words or speech segments that are audible and words or speech segments that are inaudible. During authentication, a passphrase administration unit on the administrator computer receives acoustic and visual data of a spoken phrase by a person attempting to access the secure system and evaluates whether the spoken phrase includes the pattern of audible and inaudible words or speech segments associated with the account. In this way, the techniques discussed herein may enable the administrator computer to administer spoken passphrases with an additional degree of protection than a system that is limited to using linguistic or biometric content in passwords or passphrases.

17 Claims, 7 Drawing Sheets

(56) References Cited

U.S. PATENT DOCUMENTS

| | | | | |
|---|---|---|---|---|
| 2010/0057590 A1* | 3/2010 | Wesby | ............... | G06Q 30/02 |
| | | | | 705/26.1 |
| 2010/0128882 A1* | 5/2010 | Yamabe | ............ | H03G 3/3089 |
| | | | | 381/71.1 |
| 2010/0267340 A1* | 10/2010 | Lee | ................. | G10L 21/0208 |
| | | | | 455/63.1 |
| 2014/0172430 A1* | 6/2014 | Rutherford | ........... | G06Q 20/32 |
| | | | | 704/273 |
| 2018/0286404 A1* | 10/2018 | Cech | .................. | G06F 3/167 |
| 2019/0139567 A1* | 5/2019 | Graf | ..................... | G10L 25/18 |
| 2020/0058320 A1* | 2/2020 | Liu | ....................... | G10L 15/22 |
| 2020/0089850 A1* | 3/2020 | Wan | ..................... | G06F 21/32 |

OTHER PUBLICATIONS

Science Daily, "World's first 'lip password' utilizes a user's lip motions to create password," Hong Kong Baptist University, Mar. 13, 2017, retrieved from www.sciencedaily.com/releases/2017/03/170313110742.htm, 3 pp.

Sengupta et al., "Automated Lip Reading Technique for Password Authentication," International Journal of Applied Information Systems (IJAIS), vol. 4, No. 3, ISSN: 2249-0868, Sep. 2012, 7 pp.

Hassanat, "Visual Passwords Using Automatic Lip Reading," International Journal of Sciences: Basic and Applied Research, vol. 13, No. 1, ISSN 2307-4531, Jan. 2014, 15 pp.

Lu et al., "LipPass: Lip Reading-based User Authentication on Smartphones Leveraging Acoustic Signals," IEEE Conference on Computer Communications, INFOCOM 2018, Apr. 16-19, 2018, 9 pp.

* cited by examiner

| Passphrase | The | quick | brown | fox | jumps | over | the | lazy | dog |
|---|---|---|---|---|---|---|---|---|---|

| Patterned Passphrase | The | [quick] | [brown] | fox | jumps | o - ver | the | [la - zy] | dog |
|---|---|---|---|---|---|---|---|---|---|

| Pattern | 1 | 0 | 0 | 1 | 1 | 1 | 1 | 1 | 0 | 0 | 1 |
|---|---|---|---|---|---|---|---|---|---|---|---|

FIG. 7

COMPUTER-BASED SYSTEMS FOR ADMINISTERING PATTERNED PASSPHRASES

TECHNICAL FIELD

The invention relates to computer-based systems configured for administration of passphrases.

BACKGROUND

An account holder may use a spoken password to quickly and easily unlock an account. However, the spoken password may be overheard by a person or device nearby the account holder, which may compromise the security of the account. Alternatively, a biometric method of verification may be used in the presence of other people or devices, such as a scan of an account holder's face. However, such biometric methods may be data intensive and subject to high error rates due to variation in an ambient environment in which the biometric data is captured or changes to an account holder's voice or appearance. Further, biometric data may not be readily changed by the account holder, offering the account holder less control over verification than a user-selected password.

SUMMARY

In general, this disclosure describes computer-based techniques for administering spoken passphrases. More specifically, the computer-based techniques include administering a spoken passphrase that includes a pattern of audible and inaudible speech segments using acoustic and visual data. This 'spoken' passphrase may be a combination of audible and inaudible utterances by a person, as well as synthetic voice and sounds. The synthetic portions may be dynamically generated, recorded, or may be a processed version of the user's utterances. For example, during a particular section of the utterance, the user may indicate that the sound should receive special processing, for example by touching a sensor (such as a soft button on a mobile device, or through a hand signal or other gesture). This processing could be bespoke, and involve notch filters or other alterations of the Fourier spectrum. If desired, the processing can be obvious to humans—e.g. pitch distortion.

A spoken passphrase may include linguistic content, such as words and combinations of words selected by a user, and biometric content, such as biometric data associated with a manner in which the user speaks the words or combination of words. However, spoken passphrases discussed herein may also include non-linguistic, non-biometric pattern content that enables a user to encode an additional level of information into a spoken password.

To administer the spoken patterned passphrase, the disclosed techniques enable a passphrase processing unit running on an administrator computer to generate passphrase data for an account using acoustic data and video data representing a spoken phrase by a speaker. For example, the speaker may speak the passphrase and capture an audio and video recording of the spoken passphrase. This passphrase may include a pattern of speech segments, such as words, syllables, phonemes, allophone, or sounds, that are voiced (i.e. audible) and words, syllables, or movements corresponding to speech segments that are not voiced (i.e. inaudible). For example, the speaker may speak "The quick brown fox jumps over the lazy dog," with "quick," "brown," and "lazy" unvoiced and the remaining words voiced. This pattern of speech segments may represent an additional mechanism for encrypted information in a passphrase that may supplement or replace linguistic or biometric information of a passphrase.

The disclosed techniques may further enable a passphrase administration unit on the administrator computer to receive acoustic and visual data of a spoken phrase by a person attempting to access the account and evaluate whether the spoken phrase includes the pattern of audible and inaudible speech segments associated with the account. In the example above, the person may have overheard the phrase "The fox jumps over the dog" spoken by the speaker and attempted to access the account using this information, only to be denied access to the account due to missing information corresponding to the inaudible words ("quick," "brown," and "lazy"). In this way, the techniques discussed herein may enable the administrator computer to administer spoken passphrases with an additional degree of protection than a system that is limited to using linguistic or biometric content in passwords or passphrases.

Further, discloses techniques discussed herein may enable the passphrase administration unit on the administrator computer to vary linguistic content of a passphrase while administering a pattern of a passphrase. For example, rather than a speaker selecting a passphrase, a speaker may select a rule associated with a pattern that may be applied to a generic passphrase, such as "do not voice adjectives" or "do not voice the second, third, and seventh words." The passphrase administration unit may display the passphrase "The quick brown fox jumps over the lazy dog" and the user may speak the word using the rule associated with the pattern. In this way, the techniques described herein may enable the administrator computer to administer spoken passphrases with varying linguistic content for a higher degree of protection than a system limited to static content in passwords or passphrases.

In one example, this disclosure is directed to a method by one or more processors of a computing device, including receiving acoustic data and visual data representing a spoken phrase by a speaker and determining, based on the acoustic data and visual data representing the spoken phrase, a pattern of audible and inaudible speech segments of the spoken phrase. The method further includes determining that the pattern of audible and inaudible speech segments of the spoken phrase matches a pattern of audible and inaudible speech segments of a passphrase and, in response, authorizing the speaker.

In another example, this disclosure is directed to a computing device comprising a memory and one or more processors in communication with the memory. The one or more processors are configured to receive acoustic data and visual data representing a spoken phrase by a speaker and determine, based on the acoustic data and visual data representing the spoken phrase, a pattern of audible and inaudible speech segments of the spoken phrase. The one or more processors are further configured to determine that the pattern of audible and inaudible speech segments of the spoken phrase matches a pattern of audible and inaudible speech segments of a passphrase and, in response, authorize the speaker.

In a further example, this disclosure is directed to a non-transitory computer-readable storage medium having stored thereon instructions that, when executed, cause one or more processors to receive acoustic data and visual data representing a spoken phrase by a speaker and determine, based on the acoustic data and visual data representing the spoken phrase, a pattern of audible and inaudible speech segments of the spoken phrase. The instructions further cause the one or more processors to determine that the pattern of audible and inaudible speech segments of the spoken phrase matches a pattern of audible and inaudible speech segments of a passphrase and, in response, authorize the speaker.

The details of one or more examples of the invention are set forth in the accompanying drawings and the description below. Other features, objects, and advantages of the invention will be apparent from the description and drawings, and from the claims.

BRIEF DESCRIPTION OF DRAWINGS

FIG. 7 is a schematic diagram illustrating an example passphrase that includes audible and inaudible speech segment, in accordance with techniques of this disclosure.

DETAILED DESCRIPTION

Figure 1:
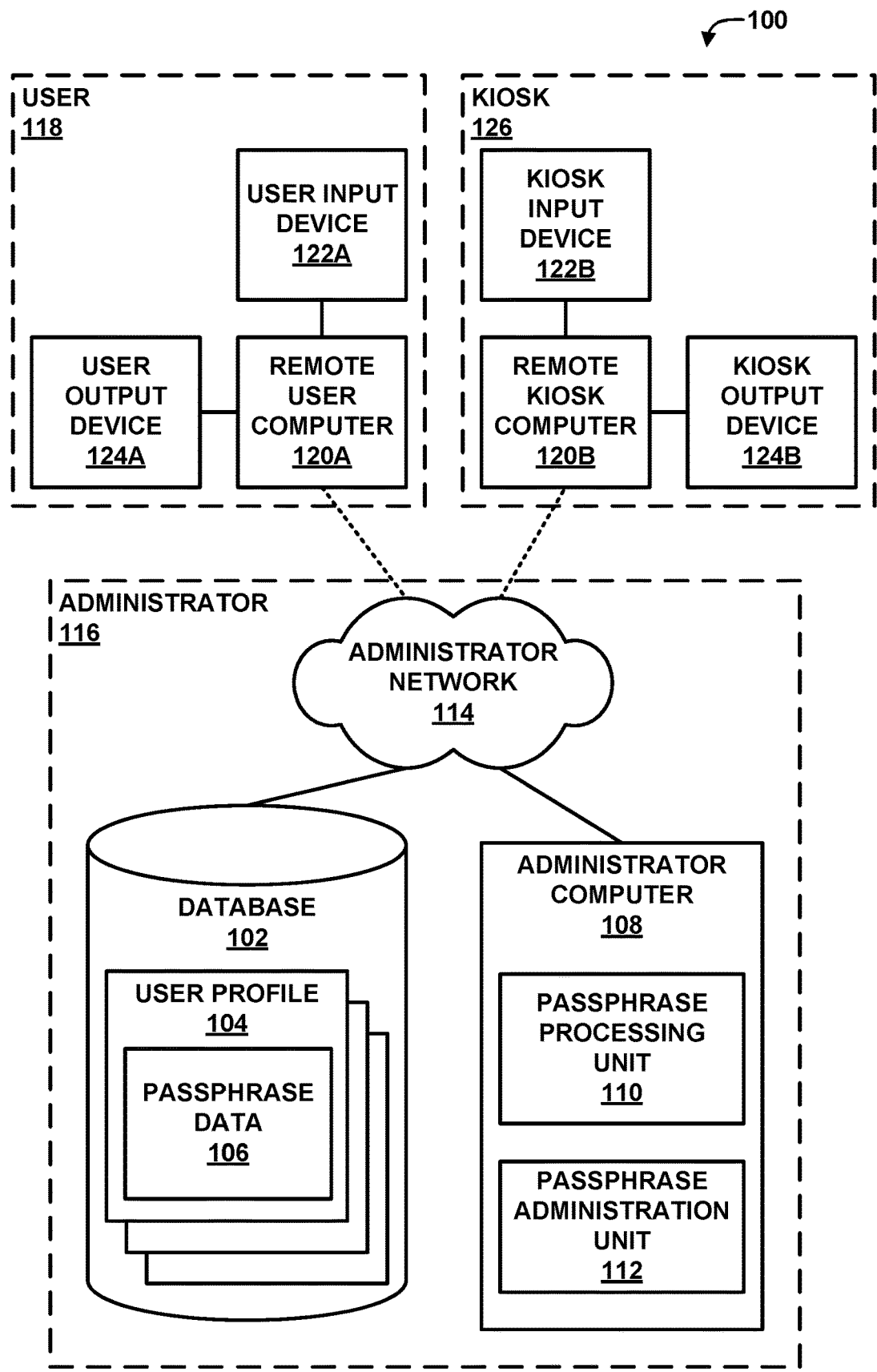
FIG. 1 is a block diagram illustrating an example system that includes an administrator computer configured to generate, store, and administer passphrase data to control access to an account, in accordance with the techniques of this disclosure.

FIG. 1 is a block diagram illustrating an example system 100 to generate, store, and administer passphrase data to control access to an account, in accordance with the techniques of this disclosure. In the example of FIG. 1, system 100 includes an administrator 116, a user 118, and a kiosk 126. However, in other examples, any of administrator 116, user 118, or kiosk 126 may be a same entity.

User 118 may be any entity that provides passphrase data to administrator 116. In some examples, user 118 may be a customer or account holder of an institution, such as a financial institution, that has an account, such as a financial account, with the institution. To protect the account, user 118 may choose to associate a passphrase with the account.

User 118 may include a remote user computer 120A configured to send, process, and/or transmit data, such as passphrase data, to and from user input devices 122A, user output devices 124A, and administrator network 114. User 118 may include one or more user input devices 122A coupled to remote user computer 120A and configured to receive passphrase data from user 118. For example, to access the account, user 118 may provide a passphrase to the institution through user input device 122A, such as through a keyboard, a camera, a microphone, or any other input device capable of capturing the passphrase data. User input devices 122A may include any device configured to receive passphrase data from user 118, such as a camera for visual data, a microphone for audio data, a keyboard for tactile data, and the like. User 118 may include one or more user output devices 124A coupled to remote user computer 120A and configured to send or display passphrase data to user 118. For example, to indicate successful or unsuccessful access to the account, user 118 may receive a notification through user output device 124A, such as through a display (a cathode ray tube (CRT) monitor, a liquid crystal display (LCD), organic light emitting diode (OLED)), speaker, or any other output device capable of conveying information related to the passphrase data and generating intelligible output to a user. User output devices 124A may include any device configured to send or display passphrase data to user 118, such as a display for visual data, a speaker for acoustic data, and the like. In certain examples, user input device 122A and output device 124A may be a same device. For example, user input device 122A and user output device 124A may be a touch sensitive screen and may present one or more touch sensitive GUI elements. For example, user 118 may be able to interact with user output device 124A as user input device 122A to respond to options displayed on user output device 124A and initiate an action by touching one or more of the touch sensitive GUI elements displayed on user output device 124A. For example, user output device 124A may be a presence-sensitive display that displays a GUI and receives input from user 118 using capacitive, inductive, and/or optical detection at or near the presence sensitive display. Alternatively or in addition, user 118 may be able to interact with user input device 122A to respond to options displayed on user output device 124A and initiate an action by using any suitable input device such as, for example, a keyboard, touchpad, and/or any other suitable input device. Although FIG. 1 only illustrates one user input device 122A, one user output device 124A, and one remote user computer 120A, in other examples, system 100 may include more than one of any of user input device 122A, user output device 124A, and remote user computer 120A.

Kiosk 126 may be any entity, machine, or facility that is available to a user, such as user 118, to provide passphrase data to administrator 116. In some examples, kiosk 126 may be a remote station, such as an automatic teller machine (ATM) associated with administrator 116. In the example of FIG. 1, kiosk 126 may include a remote kiosk computer 120B configured to send, process, and/or transmit data, such as passphrase data, to and from kiosk input devices 122B and administrator network 114. Kiosk 126 may include one or more kiosk input devices 122B coupled to remote kiosk computer 120B and configured to receive passphrase data from user 118. For example, to access the account, user 118 may provide a passphrase to the institution through kiosk input device 122B, such as through a keyboard, a camera, a microphone, or any other input device capable of capturing the passphrase data. Kiosk input device 122B may include any device configured to receive passphrase data from user 118, such as a camera for visual data, a microphone for audio data, a keyboard for tactile data, and the like. User 118 may include one or more kiosk output devices 124B coupled to remote kiosk computer 120B and configured to send or display passphrase data to user 118. For example, to indicate successful or unsuccessful access to the account, user 118 may receive a notification through kiosk output device 124B, such as through a display, speaker, or any other output device capable of conveying information related to the passphrase data. Kiosk output devices 124B may include any device configured to send passphrase data to user 118, such as a display for visual data, a speaker for acoustic data, and the like. Although FIG. 1 only illustrates one kiosk input device 122B, one kiosk output device 124B, and one remote kiosk computer 120B, in other examples, system 100 may include more than one of any of kiosk input device 122B, kiosk output device 124B, and remote kiosk computer 120B.

Administrator 116 may be any entity that controls passphrase data of user 118. For example, administrator 116 may be an institution through which user 118 holds an account, such that user 118 may entrust administrator 116 with a passphrase of user 118 associated with the account. Administrator 116 may control access to the account data for user 118 based on passphrase data provided to administrator 116. Administrator 116 may include a variety of entities including, but not limited to, financial institutions, merchants, secured facilities, or any other entity that protects access of physical or virtual resources using a secure account.

Remote user computer 120A and/or remote kiosk computer 120B (singularly and collectively referred to respectively as "remote computer 120" and "remote computers 120") may be configured to receive, process, and/or transmit passphrase data to and from user input device 122A and/or kiosk input device 122B (singularly and collectively referred to respectively as "input device 122" and "input devices 122") or user output device 124A and/or kiosk output device 124B (singularly and collectively referred to respectively as "output device 124" and "output devices 124"). User 118 may speak a phrase corresponding to a passphrase or attempted passphrase into one or more input devices 122, such as part of a request to access an account or in response to a prompt on output devices 124.

Input devices 122 may be configured to capture acoustic data and visual data representing the spoken phrase by user 118. For example, a microphone may capture the sounds of user 118 speaking the phrase and a camera may capture video or images of the face of user 118 speaking the phrase. In some examples, input device 122 may be a smartphone or other mobile device that may be used in a public location. Remote computers 120 may be configured to send the acoustic data and visual data representing the spoken phrase to administrator computer 108 of administrator 116. In some examples, remote computers 120 may send the acoustic data and visual data as part of a request to set up a passphrase. For example, user 118 may be attempting to set up an account that requires a passphrase. In some examples, remote computer 120 may send the acoustic data and visual data as part of a request to access an account. For example, user 118 may be attempting to access a previously-established account that requires the use of a passphrase.

Administrator 116 includes administrator computer 108 and database 102 in communication with each other via administrator network 114. Administrator network 114 may comprise a private network including, for example, a private network associated with an organization, or may comprise a public network, such as the Internet. Although illustrated in FIG. 1 as a single entity, in other examples administrator network 114 may comprise a combination of public and/or private networks.

Database 102 may include user profiles 104 containing passphrase data 106 for each user. Administrator computer 108 is configured to control access to an account of a user, such as user 118, using passphrase data 106 for user 118. Administrator computer 108 may include passphrase processing unit 110 and passphrase administration unit 112. Although FIG. 1 only illustrates one database 102 and one administrator computer 108, in other examples, system 100 may include more than one of any of database 102 and administrator computer 108.

Database 102 may be a data structure for storing data related to the system 100 including user profiles 104. Although illustrated in FIG. 1 as being included within administrator 116, database 102 may be stored by any suitable party and in any suitable location according to particular needs. For example, database 102 may be stored and maintained by an organization associated with system 100 or by a third-party vendor that stores and maintains data. Although illustrated as a single database 102, any suitable number of databases may be used for storing the data described according to particular needs. Although shown as being separate from administrator computer 108, in certain examples, database 102 may be stored and executed within administrator computer 108.

Each of user profiles 104 stored in database 102 may be associated with a user and contain passphrase data 106 for the user. Passphrase data 106 may include any passphrase information associated with a previously or potentially spoken passphrase. A spoken passphrase may include any combination of speech segments. A speech segment may include any sound, movement, combination of sounds, combination of movements, or combinations of one or more sounds and one or more movements used to produce speech including, but not limited to, phones, allophones, phonemes, visemes, sounds, syllables, or words, whether uttered or unuttered, that are conveyed by a speaker. For example, a spoken passphrase may include both audible and inaudible speech segments. Passphrase data 106 may include content data, acoustic data, visual data, pattern data, or any other data associated with a spoken passphrase of user 118. In some examples, passphrase data 106 includes passphrase data sent to administrator computer 108 by user 118. For example, passphrase data 106 may include a passphrase provided by user 118. In some examples, passphrase data 106 may include more than one passphrase for a user. For example, passphrase data 106 may include multiple passphrases associated with a user for user profile 104. In some examples, a passphrase may be associated with an account, such that a user with multiple accounts may have multiple passphrases, each passphrase associated with an account.

Passphrase data 106 may include content data representing linguistic content of the spoken passphrase. For example, content data may include data that includes or indicates combinations of words of the spoken passphrase. For example, content data may include an identification and order of the words "the," "quick," "brown," "fox," "jumps," "over," "the," "lazy," and "dog" that constitute a spoken passphrase.

Passphrase data 106 may include acoustic data representing acoustic properties of user 118 speaking the spoken passphrase. For example, acoustic data may include an audio recording of user 118 speaking the passphrase, data representing acoustic characteristics or features (e.g., pitch, loudness, etc.) of the spoken passphrase, or any other data corresponding to acoustic properties of the spoken passphrase.

Passphrase data 106 may include visual data representing visual properties of user 118 speaking the spoken passphrase. For example, acoustic data may include a video recording of user 118 speaking the passphrase, data representing visual characteristics or features (e.g., facial feature dimensions or shapes, etc.) of user 118 speaking the spoken passphrase, or any other data corresponding to visual properties of user 118 speaking the spoken passphrase.

Passphrase data 106 may include pattern data representing a pattern of content, acoustic features, visual features, or any combination thereof, of a spoken or generated passphrase. For example, a passphrase may include a variety of linguistic and acoustic elements that may be categorized or parameterized into respective categories or values. These categories or values may form patterns within the passphrase, such that a pattern of the categories or values may be another form of encrypted information available within the passphrase. Linguistic properties, such as categories of information within a language or placements of words within a sentence, may be readily accessible and memorable to a user, such that a pattern using linguistic properties may be easily remembered or used. Acoustic properties, such as speech volume, may be readily controllable by a user, who may facilitate processing of some elements of the data stream, such that a pattern using acoustic properties may be easily rendered.

In some examples, pattern data may include data related to a pattern of audible and inaudible speech segments of a passphrase. For example, some words or syllables of a passphrase may be uttered at or above an audible threshold (e.g., "audible," parameterized to "1"), while other words, or syllables of the passphrase may be unuttered or uttered below the audible threshold (e.g., "inaudible," parameterized to "0"). The pattern of these audible and inaudible words or syllables may represent an aspect of encryption of the passphrase, such that a phrase that may match a passphrase in linguistic and biometric content may not match the passphrase in pattern content.

In some examples, in addition or in lieu of the audible threshold, a user input may be used to parameterize a speech segment. For example, a user may push a button or perform some other action while speaking a passphrase that indicates a particular treatment of the speech segments of the passphrase spoken while the particular action was performed. The particular treatment may include, for example a filtering or other form of processing of the particular speech segments. In this way, a user can further pattern a passphrase.

In some examples, the pattern of audible and inaudible speech segments of a passphrase may be specific to a particular passphrase. For example, user 118 may select the passphrase "The [quick] [brown] fox jumps over the [lazy] [[dog,]]" with the single bracketed words inaudible (i.e., mouthed), the unbracketed words audible (i.e., spoken aloud), and the double bracketed word run through a notch filter so some frequencies are removed. As such, the pattern of audible speech segments may be a property of the particular passphrase, along with the actual words and acoustic or visual properties of user 118 producing those spoken words. In some examples, the pattern of audible and inaudible speech segments of a passphrase is generic to the passphrase, such that the pattern may be applied to a variety of passphrases. In the example above, user 118 may select a content-based rule for a passphrase pattern in which adjectives (quick, brown, and lazy) are inaudible, or a non-content-based rule for a passphrase pattern in which the second (quick), third (brown), and seventh (lazy) words are inaudible, and in which the remaining words are audible. As such, the pattern of audible and inaudible speech segments as applied to the generic passphrase may be an encrypted element of the passphrase. In some examples, pattern data may be generated or derived from acoustic data and/or visual data representing a spoken passphrase, such as through pattern recognition. In some examples, pattern data may be received from a speaker, such as in a form of a pattern or rule selection.

Administrator computer 108 may be associated with administrator 116. As illustrated in FIG. 1, in some examples, administrator computer 108 may be a centralized computing device configured to execute passphrase processing unit 110 and/or passphrase administration unit 112 for controlling access to an account of user 118 using passphrase data. Administrator computer 108 may comprise a cluster of one or more computers, workstations, servers, and the like. Administrator computer 108 configured to execute passphrase processing unit 110 and/or passphrase administration unit 112 may be physically or virtually included within an internal network of an organization. Alternatively, administrator computer 108 configured to execute passphrase processing unit 110 and/or passphrase administration unit 112 may be physically or virtually included in a network hosted by a third-party vendor. For example, a vendor of an organization may store and maintain passphrase processing unit 110 and/or passphrase administration unit 112 for an organization and/or may provide the functions of passphrase processing unit 110 and/or passphrase administration unit 112 as a service to the intermediary institution. In some examples, administrator computer 108 may be a computing device further from a centralized node of a network.

In some examples, passphrase processing unit 110 may be configured to generate pattern data associated with user 118 using acoustic and/or visual data from user 118. During generation of a passphrase by user 118, passphrase processing unit 110 may be configured to receive acoustic data and visual data representing the passphrase spoken by user 118. For example, user 118 may generate an audio and video recording of user 118 speaking a passphrase that includes audible and inaudible speech segments, such as by using input devices 122 and remote computer 120.

In some examples, passphrase processing unit 110 may be configured to determine a pattern of audible and inaudible speech segments of the passphrase based on acoustic data representing the passphrase. For example, while certain syllables of the passphrase may be inaudible to a human, such syllables may be capable of detection by a microphone or other sensitive audio sensor. As such, passphrase processing unit 110 may be configured to identify a plurality of speech segments of the passphrase using the acoustic data. For example, passphrase processing unit 110 may determine that a portion of the passphrase is a generic word or syllable, such as by voice change recognition, or that the portion of the passphrase is identified with a particular word or syllable, such as by speech recognition. Passphrase processing unit 110 may be configured to determine whether each speech segment of the plurality of speech segments is an audible or an inaudible speech segment based on whether an acoustic property of the speech segment, such as a magnitude of speech energy, meets an audibility threshold. In some examples, user 118 may select the audibility threshold.

In some examples, passphrase processing unit 110 may be configured to determine a pattern of audible and inaudible speech segments of the passphrase based on both the acoustic data and the visual data representing the passphrase. For example, if a passphrase is spoken or intended to be spoken in a loud environment, inaudible syllables may be difficult or impossible to detect with a desired accuracy using only acoustic data. As such, passphrase processing unit 110 may be configured to determine a presence or content of a plurality of speech segments of the passphrase using the visual data or a combination of the acoustic data and the visual data. For example, passphrase processing unit 110 may determine that a portion of the passphrase is a particular word or syllable, such as by speech recognition using visual features of a speaker's face. Passphrase processing unit 110 may be configured to determine whether each speech segment of the plurality of speech segments is an audible speech segment or an inaudible speech segment based on whether each speech segment identified from the visual data has a corresponding acoustic feature at or above an audibility threshold (i.e., audible) or below the audibility threshold (i.e., inaudible). For example, passphrase processing unit 110 may determine a plurality of syllables using visual data, determine which of the plurality of syllables are audible syllables using acoustic data, and determine that the remaining syllables of the plurality syllables are inaudible syllables.

Passphrase processing unit 110 may be configured to store, in database 102, data representing the pattern of the audible and inaudible speech segments of the passphrase as passphrase data 106 associated with a user profile 104. In some examples, passphrase processing unit 110 may store the pattern as acoustic and visual data in a relatively unprocessed state, such as through audio or video recordings. In some examples, passphrase processing unit 110 may store pattern data that identifies the pattern of audible and inaudible speech segments of the passphrase, such as by storing a sequence of the pattern or a rule associated with the pattern.

In some examples, passphrase processing unit 110 may be configured to receive pattern data associated with user 118 provided by user 118 through a user selection of a pattern. During generation of a passphrase by user 118, passphrase processing unit 110 may be configured to receive pattern data representing a pattern of audible and inaudible speech segments of the passphrase. For example, user 118 may select, such as by using input devices 122 and remote computer 120, a pattern for a passphrase, such as a passphrase that includes a pattern of audible or inaudible speech segments for a particular passphrase or a rule that corresponds to a pattern of audible or inaudible speech segments. In some examples, the pattern of audible and inaudible speech segments of a passphrase is generic to the passphrase, such that the pattern may be applied to a variety of passphrases. For example, in the example above, user 118 may select a passphrase pattern in which adjectives (quick, brown, and lazy) are inaudible, or the second (quick), third (brown), and seventh (lazy) words are inaudible, and the remaining words are audible. Passphrase processing unit 110 may be configured to store, in database 102, the pattern data as passphrase data 106 associated with a user profile 104.

During authentication of a passphrase by user 118, passphrase processing unit 110 may be configured to receive acoustic data and visual data representing a spoken phrase by a speaker. For example, user 118 may send a request from remote computer 120 to access an account. Administrator computer 108 may be configured to process requests for access to an account associated with user profiles 104, such requests including acoustic data and/or visual data representing a spoken phrase. Passphrase processing unit 110 may be configured to determine, based on the acoustic data and/or visual data representing the spoken phrase, a pattern of audible and inaudible speech segments of the spoken phrase. For example, as explained above with respect to determining a pattern of audible and inaudible speech segments of a spoken passphrase, passphrase processing unit 110 may be configured to determine a plurality of speech segments of the spoken phrase, determine audible and inaudible speech segments of the spoken phrase, and determine a pattern of the audible and inaudible speech segments of the spoken phrase.

Passphrase administration unit 112 may be configured to determine whether a pattern of audible and inaudible speech segments of the spoken phrase matches a pattern of audible and inaudible speech segments of a passphrase. For example, passphrase administration unit 112 may be configured to retrieve the pattern of audible and inaudible speech segments of the passphrase stored in database 102 based on a user ID or other identification of user 118 attempting to access an account, such as may be provided in the request for access to the account. Passphrase administration unit 112 may be configured to compare the pattern of audible and inaudible speech segments of the passphrase and the pattern of audible and inaudible speech segments of the spoken phrase and determine, based on the comparison of the patterns of audible and inaudible speech segments, whether the patterns of audible and inaudible speech segments match.

Passphrase administration unit 112 may be configured to perform one or more actions in response to determining whether a pattern of audible and inaudible speech segments of a spoken phrase matches a pattern of audible and inaudible syllables of a passphrase. In some examples, passphrase administration unit 112 may authorize the speaker in response to determining that the pattern of audible and inaudible speech segments of the spoken phrase matches the pattern of audible and inaudible speech segments of the passphrase. For example, passphrase administration unit 112 may send an authorization signal to a server that controls access to an account database that permits user 118 to access the account database. Passphrase administration unit 112 may be configured to refrain from authorizing the speaker in response to determining that the pattern of audible and inaudible speech segments of the spoken phrase do not match the pattern of audible or inaudible segments of the passphrase. Once authorized, the speaker may gain access to a secure system, such as an account or physical structure.

While administrative computer 108 may be configured to generate and use pattern data from acoustic and/or visual data for controlling access to an account, administrative computer 108 may also be configured to generate and utilize passphrase data other than pattern data representing a pattern of audible and inaudible speech segments. For example, administrative computer 108 may be configured to use pattern data as one aspect of an authentication process that evaluates content of a passphrase or acoustic and/or visual properties of a speaker of a passphrase to determine whether to authenticate a speaker and permit access to an account.

In some examples, administrator computer 108 may be configured to determine linguistic or content data of a spoken passphrase. For example, passphrase processing unit 110 may be configured to determine a linguistic content of a plurality of audible or inaudible speech segments of the spoken phrase based on the acoustic data and/or the visual data representing the spoken phrase, such as through speech recognition. Passphrase administration unit 112 may be configured to determine whether the plurality of audible or inaudible speech segments of the spoken phrase match a plurality of audible or inaudible speech segments of the passphrase, such that authorization of the speaker may be further based on whether the plurality of audible or inaudible speech segments of the spoken phrase match the plurality of audible or inaudible speech segments of the passphrase.

In some examples, administrator computer 108 may be configured to determine biometric data of a spoken passphrase. For example, passphrase processing unit 110 may be configured to determine one or more identifying characteristics of the speaker based on the acoustic data and/or the visual data representing the spoken phrase. Passphrase administration unit 112 may be configured to determine whether the one or more identifying characteristics of the speaker match one or more identifying characteristics of a speaker of the passphrase, such that authorization of the speaker may be further based on whether the one or more identifying characteristics of the speaker match the one or more identifying characteristics of the speaker of the passphrase.

Figure 2:
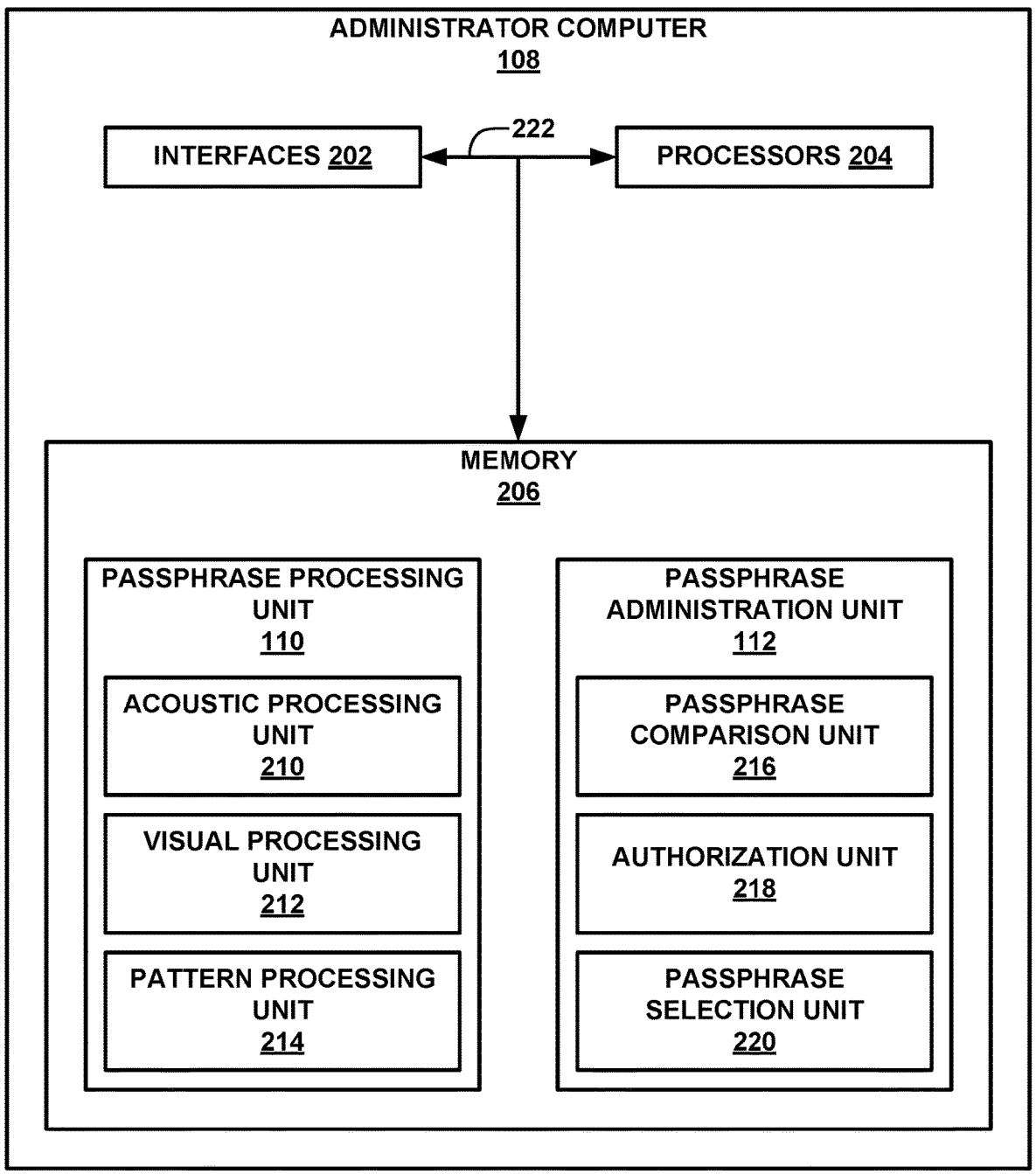
FIG. 2 is a block diagram illustrating an example administrator computer of FIG. 1 in further detail.

FIG. 2 is a block diagram illustrating an example administrator computer of FIG. 1 in further detail. Administrator computer 108 may include interfaces 202, processors 204, memory 206, and a communication bus 222.

Administrator computer 108 may include one or more interfaces 202 for allowing passphrase processing unit 110 and passphrase administration unit 112 to communicate with one or more databases (e.g., database 102), servers, devices and/or networks via one or more networks, e.g. administrator network 114. The one or more interfaces 202 may include one or more network interface cards, such as Ethernet cards, and/or any other types of interface devices that can send and receive information. In some examples, passphrase processing unit 110 and passphrase administration unit 112 utilize the one or more interfaces 202 to communicate with database 102 and/or any other suitable device. Any suitable number of interfaces may be used to perform the described functions according to particular needs.

Administrator computer 108 may include one or more processors 204 configured to implement functionality and/or process instructions for execution within passphrase processing unit 110 and passphrase administration unit 112. Processors 204 may include, for example, microprocessors, digital signal processors (DSPs), application specific integrated circuits (ASICs), field-programmable gate arrays (FPGAs), and/or equivalent discrete or integrated logic circuitry.

Administrator computer 108 may include memory 206 configured to store information within administrator computer 108. Memory 206 may include a computer-readable storage medium or computer-readable storage device. In some examples, memory 206 may include one or more of a short-term memory or a long-term memory. Memory 206 may include, for example, random access memories (RAM), dynamic random access memories (DRAM), static random access memories (SRAM), magnetic hard discs, optical discs, floppy discs, flash memories, or forms of electrically programmable memories (EPROM), or electrically erasable and programmable memories (EEPROM). In some examples, memory 206 may store logic (e.g., logic of passphrase processing unit 110 and passphrase administration unit 112) for execution by one or more processors 204. In further examples, memory 206 may be used by passphrase processing unit 110 and passphrase administration unit 112 to temporarily store information during program execution.

In operation, passphrase processing unit 110 and passphrase administration unit 112 may be used to control access to an account using a passphrase that includes audible and inaudible speech segments. In the example of FIG. 2, passphrase processing unit 110 includes acoustic processing unit 210, visual processing unit 212, and pattern processing unit 214, while passphrase administration unit 112 includes passphrase comparison unit 216, authorization unit 218, and passphrase selection unit 220. In other examples, however, passphrase processing unit 110 and/or passphrase administration unit 112 may include greater or fewer units than described in FIG. 2.

In general, passphrase processing unit 110 may be configured to process passphrase data provided by users 118 and store the processed data in database 102 of FIG. 1, such that the passphrase data may be linked to a corresponding user profile 104. Passphrase processing unit 110 includes acoustic processing unit 210, visual processing unit 212, and pattern processing unit 214.

Acoustic processing unit 210 may be configured to receive acoustic data representing a spoken phrase. For example, acoustic processing unit 210 may receive acoustic data from remote computer 120 through interface 202. Acoustic processing unit 210 may be configured to process the acoustic data to extract one or more acoustic features of the acoustic data. For example, acoustic processing unit 210 may be configured to use audio signal processing techniques to extract features such as loudness (e.g. amplitude of energy), pitch (e.g. frequency of energy), and other sound properties that may be collected over a period of time.

In some examples, acoustic processing unit 210 may be configured to identify, based on the one or more acoustic features, a plurality of audible and inaudible speech segments. For example, the one or more acoustic features may indicate one or more boundaries of a syllable, such that acoustic processing unit 210 may be configured to identify the presence of a plurality of syllables. In some examples, acoustic processing unit 210 may be configured to qualitatively determine, based on the acoustic data representing the spoken phrase, a plurality of audible or inaudible speech segments of the spoken phrase. For example, acoustic processing unit 210 may be configured to use acoustic-based speech recognition techniques to characterize the one or more acoustic features into a plurality of syllables corresponding to syllables of speech.

Acoustic processing unit 210 may be configured to measure acoustic properties of the plurality of speech segments that correspond to an audibility of the plurality of speech segments. For each speech segment of the plurality of speech segments identified by acoustic processing unit 210 and/or visual processing unit 212, acoustic processing unit 210 may measure an acoustic property, such as sound pressure or other measure of loudness, of the syllable and determine whether the sound pressure measurement of the speech segment meets or exceeds an audibility threshold, such as a sound pressure threshold corresponding to audibility. Acoustic processing unit 210 may be configured to identify a speech segment as an audible speech segment if the speech segment has a sound pressure measurement greater than or equal to a sound pressure threshold and identify a speech segment as an inaudible speech segment if the speech segment has a sound pressure measurement less than the sound pressure threshold.

Visual processing unit 212 may be configured to receive visual data representing a spoken phrase. For example, visual processing unit 212 may receive visual data from remote computer 120 through interface 202. Visual processing unit 212 may be configured to process the visual data to extract one or more visual features of the visual data. For example, visual processing unit 212 may be configured to use video signal processing techniques to extract features such as geometric features, image transform features, image appearance features, and other properties corresponding to facial features of a speaker that may be collected over a period of time.

Visual processing unit 212 may be configured to identify, based on the one or more visual features, a plurality of speech segments of the spoken phrase. For example, the one or more visual features may indicate one or more boundaries of a syllable, such as consonants bounding vowels, that visual processing unit 212 may be configured to identify the presence of a plurality of syllables. In some examples, visual processing unit 212 may be configured to qualitatively determine, based on the visual data representing the spoken phrase, a plurality of speech segments of the spoken phrase. For example, visual processing unit 212 may be configured to use visual-based speech recognition techniques to characterize the one or more visual features into a plurality of syllables corresponding to syllables of speech.

Pattern processing unit 214 may be configured to determine, based on a plurality of audible and inaudible speech segments, the pattern of audible and inaudible speech segments. For example, pattern processing unit 214 may treat the audible and inaudible syllables as parameterized values and generate a string or other ordered sequence based on the parameterized values.

In some examples, pattern processing unit 214 may be configured to receive pattern data representing the pattern of audible and inaudible speech segments. For example, pattern processing unit 214 may receive the pattern data from remote computer 120, such as a pattern selection.

Pattern processing unit 214 may be configured to store the generated or received pattern data as passphrase data 106 to a user profile 104 of database 102. For example, a component of passphrase processing unit 110 or passphrase administration unit 112 may be configured to extract an identity of user 118 and store the pattern data to user profile 104 associated with user 118.

In general, passphrase administration unit 112 may be configured to administer the passphrase data provided by users 118 and stored in database 102 of FIG. 1, and control authorization of a secure system, such as an account or physical structure, based on this passphrase data. Passphrase administration unit 112 includes passphrase comparison unit 216, authorization unit 218, and passphrase selection unit 220.

Passphrase comparison unit 216 may be configured to receive a request to access an account. In some examples, the request may include acoustic and/or visual data representing a spoken phrase and an indication of an identity or account associated with user profile 104. In some examples, passphrase comparison unit 216 may send a follow-up prompt for the acoustic or visual data, such as by starting an audio or video capture application, or for the indication of the identity or account associated with user profile 104. The acoustic and/or visual data may represent a spoken phrase that includes a plurality of audible and inaudible speech segments. Passphrase comparison unit 216 may send the acoustic data and/or visual data representing the spoken phrase to passphrase processing unit 110 for processing. Once the acoustic data and/or visual data has been processed, passphrase comparison unit 216 may receive pattern data based on the acoustic data and/or visual data from passphrase processing unit 210. Passphrase comparison unit 216 may be configured to retrieve passphrase data 106 from user profile 104 indicated by the identity or account indicated by the request to access the account.

Passphrase comparison unit 216 may be configured to determine whether a pattern of the plurality of audible or inaudible speech segments of the spoken phrase match a pattern of a plurality of audible or inaudible speech segments of the passphrase. Passphrase comparison unit 216 may be configured to compare the pattern of audible and inaudible speech segments of the passphrase and the pattern of audible and inaudible speech segments of the spoken phrase and determine, based on the comparison of the patterns of audible and inaudible speech segments, whether the patterns of audible and inaudible speech segments match. For example, passphrase comparison unit 216 may determine any differences between the pattern of audible and inaudible speech segments of the passphrase and the pattern of audible and inaudible speech segments of the spoken phrase and determine whether those differences exceed a threshold.

Authorization unit 218 may be configured to perform one or more actions in response to determining whether a pattern of audible and inaudible speech segments of a spoken phrase matches a pattern of audible and inaudible speech segments of a passphrase. In some examples, authorization unit 218 may be configured to authorize the speaker in response to determining that the pattern of audible and inaudible speech segments of the spoken phrase matches the pattern of audible and inaudible speech segments of the passphrase. For example, authorization unit 218 may be configured to send an authorization signal to a server that controls access to a secure system, such as an account database that permits user 118 to access the requested account of the account database. Authorization unit 218 may be configured to refrain from authorizing the speaker in response to determining that the pattern of audible and inaudible speech segments of the spoken phrase do not match the pattern of audible or inaudible speech segments of the passphrase. For example, authorization unit 218 may be configured to send a signal to remote computer 120 to display a notification to user 118 on output device 124 that request is denied. In addition, or as an alternative, to account authorization, authorization unit 218 may be configured to perform one or more other types of authorization for a variety of purposes or in a variety of secure systems, such as financial or non-financial transaction authorization, physical entry authorization, or authorization to access any other secure process or system that may be secured by a passphrase.

Passphrase selection unit 220 may be configured to administer pattern data to a passphrase. Passphrase selection unit 220 may be configured to receive a request from user 118 to access an account of user 118 and select a passphrase from a plurality of possible passphrases. In some examples, passphrase selection unit may be configured to randomly select the passphrase of the plurality of possible passphrases. For example, user 118 may not have prior knowledge of the particular passphrase of the plurality of possible passphrases. Passphrase selection unit 220 may be configured to send an indication of the passphrase to user 118. For example, passphrase selection unit 220 may be configured to send a signal to remote computer 120 to present the passphrase on output device 124 to user 118. In this way, administrator computer 108 may administer spoken passphrases with varying linguistic content for a higher degree of protection than a system limited to static content in passwords or passphrases FIGS. 3-6 are flowcharts illustrating example operation of an administrator computer and a remote computer of FIG. 1, and will be described with reference to FIG. 7. FIG. 7 is a schematic diagram illustrating an example passphrase that includes audible and inaudible speech segments. The example of FIG. 7 includes a passphrase of the string of words "The quick brown fox jumps over the lazy dog." The patterned passphrase includes the patterned string of words "The [quick] [brown] fox jumps over the [lazy] dog," for which the bracketed words are inaudible and the remaining words are audible. In the corresponding parameterized pattern, each audible syllable is represented by a "1," and each inaudible syllable is represented by a "0," such that the pattern is "10011111001."

Figure 3:
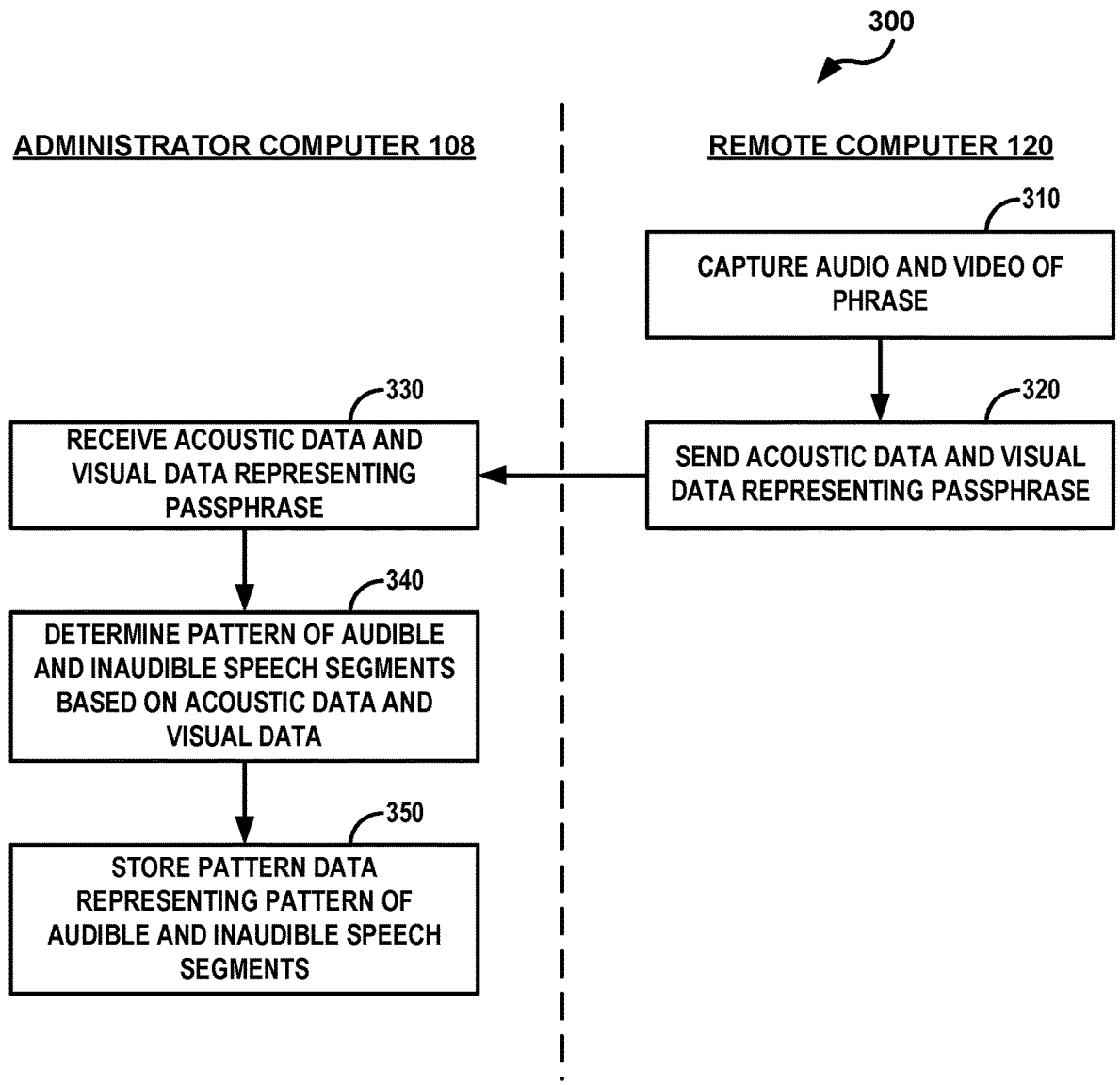
FIG. 3 is a flowchart illustrating an example operation of an administrator computer and a remote computer of FIG. 1 for generating pattern data for a passphrase that includes audible and inaudible speech segments, in accordance with the techniques of this disclosure.

FIG. 3 is a flowchart illustrating an example operation 300 of an administrator computer and a remote computer of FIG. 1 for generating pattern data for a passphrase that includes audible and inaudible speech segments, in accordance with the techniques of this disclosure. Remote computer 120 may capture audio and video of a passphrase (310). As shown in the example of FIG. 7, user 118 may speak the patterned passphrase "The [quick] [brown] fox jumps over the [lazy] dog," for which the bracketed words are inaudible and the remaining words are audible. Input device 122 and remote computer 120 may capture a recording of user 118 speaking the passphrase. Remote computer 120 may send acoustic data and visual data representing the passphrase (320).

Administrator computer 108 may receive the acoustic data and visual data representing the passphrase (330). Administrator computer 108 may determine, based on the acoustic data and visual data representing the passphrase, the pattern of audible and inaudible speech segments of the passphrase (340). In the example of FIG. 7, administrator computer 108 may determine that the words "The," "fox," "jumps," "over," "the," and "dog" are audible, and that "quick," "brown," and "lazy" are inaudible, and generate parameterized pattern data corresponding to the passphrase, such as a "1" for the syllables of audible words and a "0" for the syllables of inaudible words. The parameterized pattern "10011111001" may represent the pattern of the passphrase. Administrator computer 108 may store, in database 102, the pattern data representing the pattern of the audible and inaudible speech segments of the passphrase (350).

Figure 4:
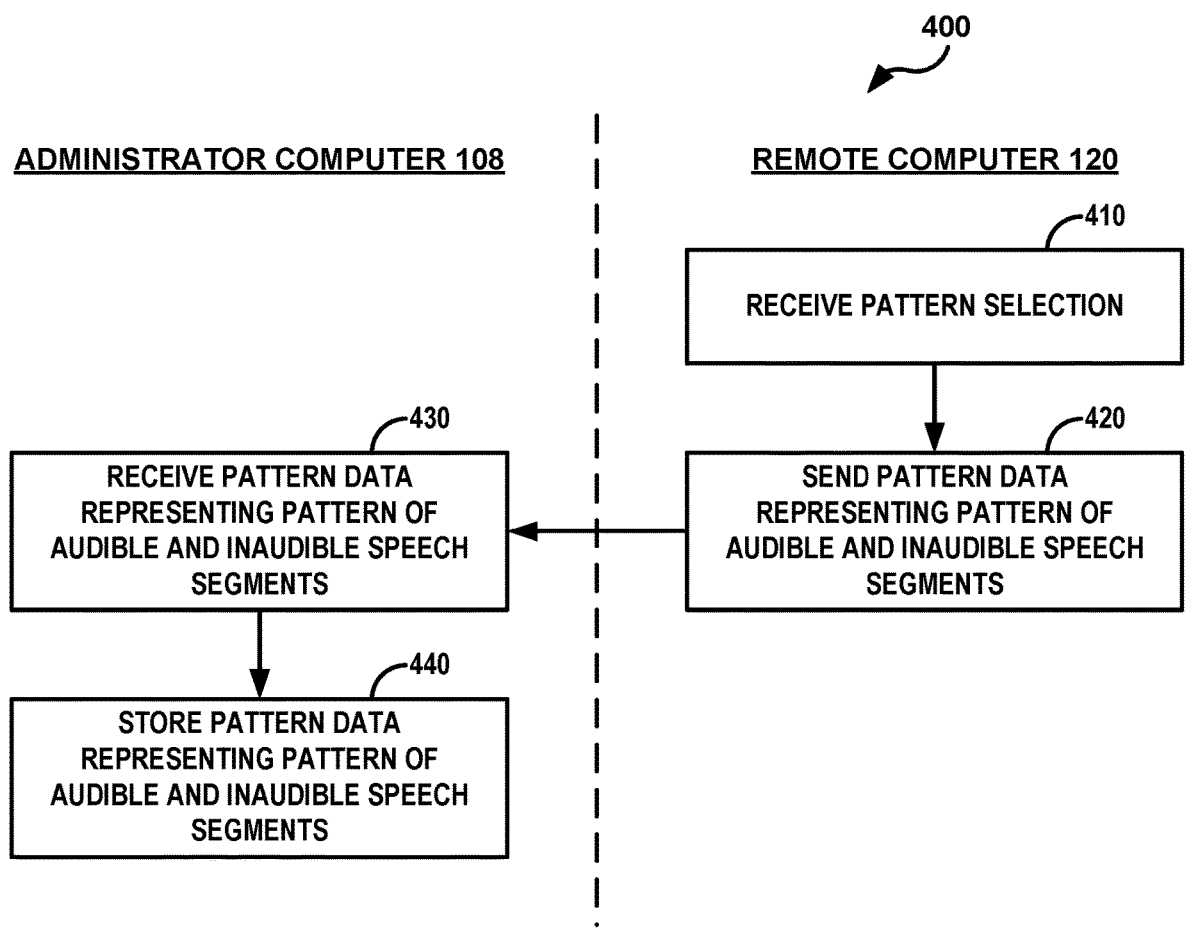
FIG. 4 is a flowchart illustrating an example operation of an administrator computer and a remote computer of FIG. 1 for receiving pattern data for a passphrase that includes audible and inaudible speech segment, in accordance with the techniques of this disclosure.

FIG. 4 is a flowchart illustrating an example operation 400 of an administrator computer and a remote computer of FIG. 1 for receiving pattern data for a passphrase that includes audible and inaudible speech segments, in accordance with the techniques of this disclosure. Remote computer 120 may receive a selection of a pattern of audible and inaudible speech segments of a passphrase from a speaker (410). For example, when setting up a passphrase, user 118 may select a pattern of audible and inaudible speech segments that may be applied to a plurality of passphrases. As such, it may be the pattern of the passphrase, not the passphrase itself, that may be used to secure an account. In the example of FIG. 7, the pattern data may include a pattern in which the second, third, and seventh words (or second, third, and eighth syllables) of a passphrase are inaudible and the remaining words or syllables are audible, as represented by the pattern "10011111001." Remote computer 120 may send pattern data representing the pattern of audible and inaudible speech segments of the passphrase (420).

Administrator computer 108 may receive pattern data representing the pattern of audible and inaudible speech segments of the passphrase (430). Administrator computer 108 may store, in a database, the pattern data (440). For example, database 102 may include a user profile 104 that includes passphrase data 106. Administrator computer 108 may store the pattern data in passphrase data 106 associated with a user profile 104 of user 118.

Figure 5:
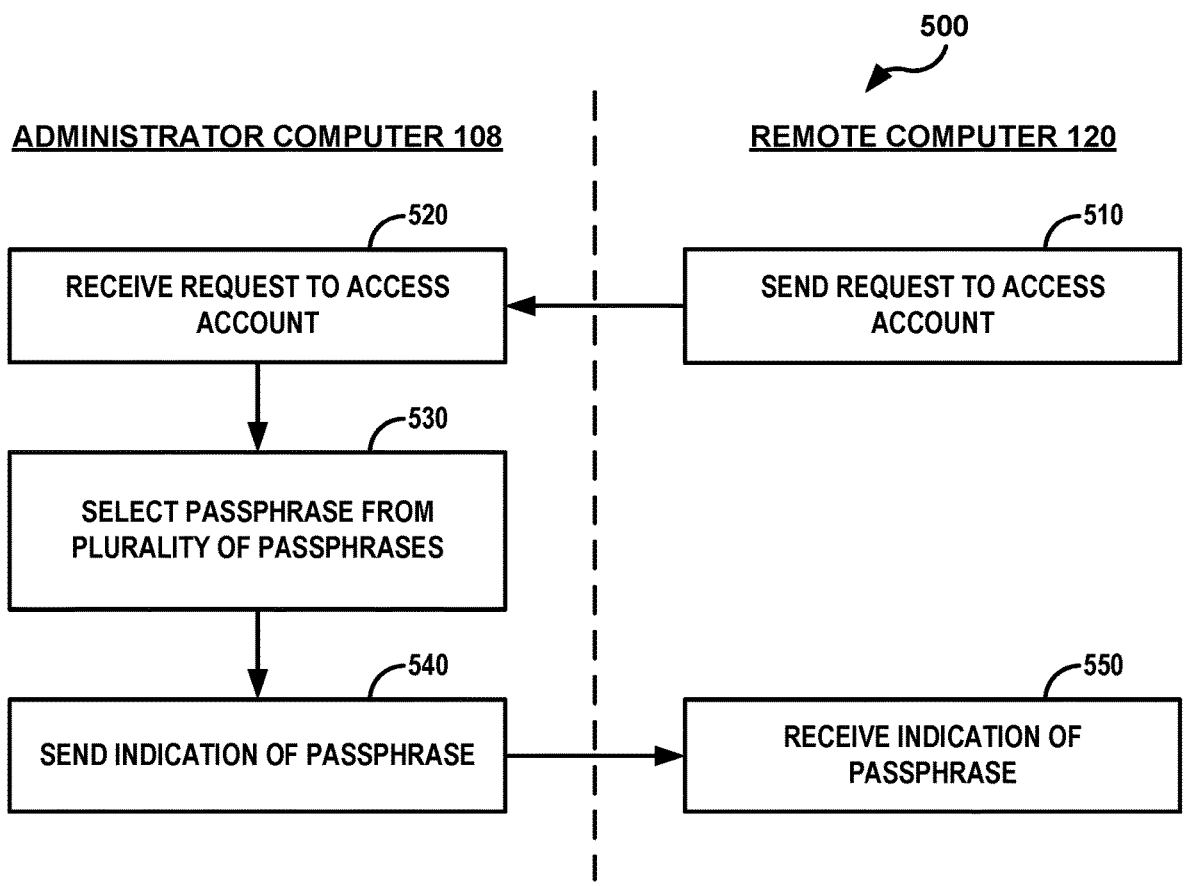
FIG. 5 is a flowchart illustrating an example operation of an administrator computer and a remote computer of FIG. 1 for generating an indication of a passphrase that includes audible and inaudible speech segment, in accordance with the techniques of this disclosure.

FIG. 5 is a flowchart illustrating an example operation 500 of an administrator computer and a remote computer of FIG. 1 for generating an indication of a passphrase that includes audible and inaudible speech segments, in accordance with the techniques of this disclosure. Remote computer 120 may send a request from a speaker to access a user account (510). For example, user 118 may cause remote user computer 120A to send a request to access an account associated with user 118. Administrator computer 108 may receive the request from the speaker to access the user account (520).

Administrator computer 108 may select the passphrase from a plurality of possible passphrases (530). In the example of FIG. 7, administrator computer 108 may randomly select the passphrase "The quick brown fox jumps over the lazy dog" from a list of possible passphrases. Administrator computer 108 may send an indication of the passphrase (540). Remote computer 120 may receive the indication of the passphrase (550). In the example of FIG. 7, user 118 may recite the passphrase using the predetermined pattern, such that the user 118 may recite the words "The," "fox," "jumps," "over," "the," and "dog" audibly, and the words "quick," "brown," and "lazy" inaudibly.

Figure 6:
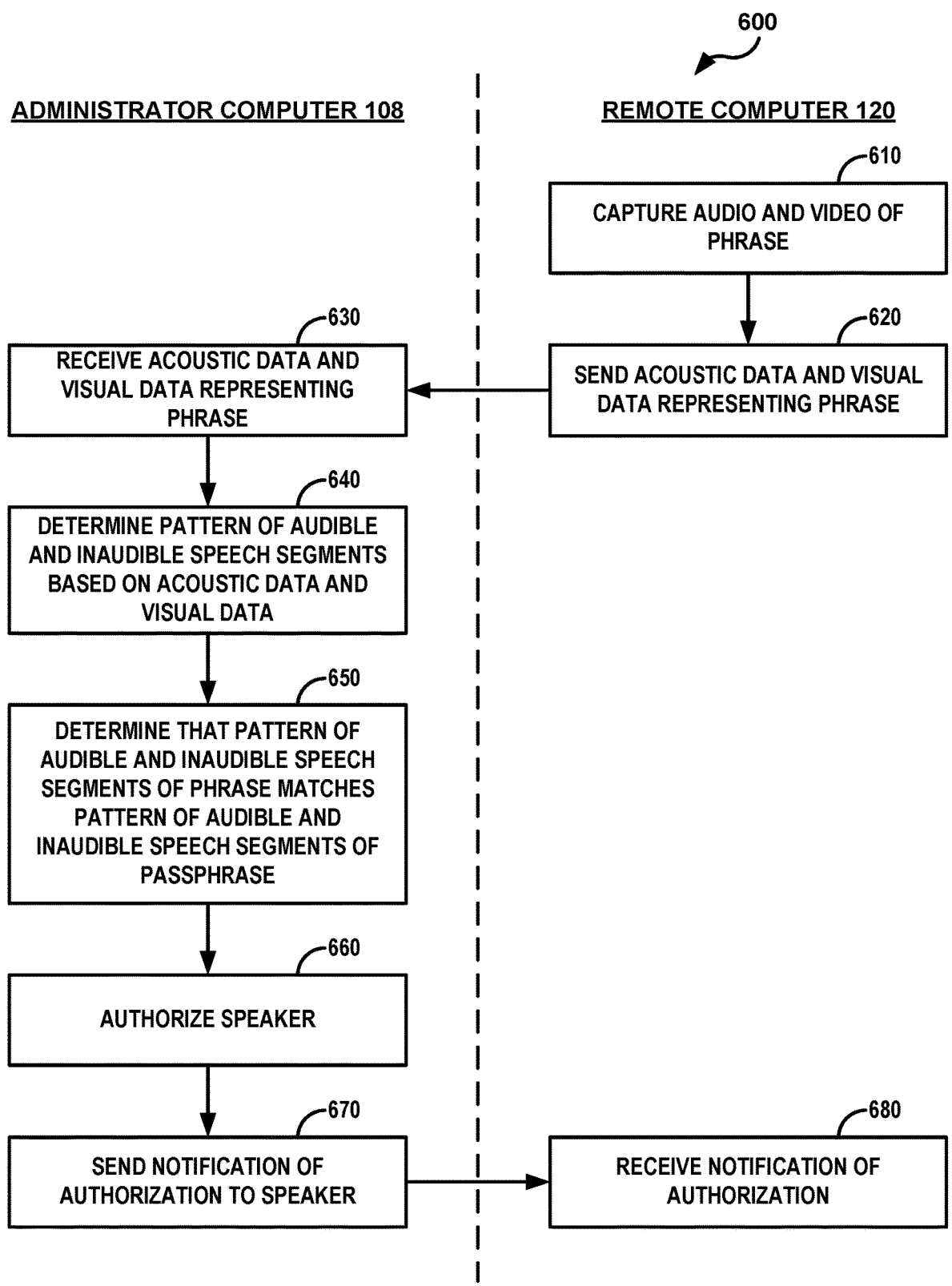
FIG. 6 is a flowchart illustrating an example operation of an administrator computer and a remote computer of FIG. 1 authorizing an account using a passphrase that includes audible and inaudible speech segment, in accordance with the techniques of this disclosure.

FIG. 6 is a flowchart illustrating an example operation 600 of an administrator computer and a remote computer of FIG. 1 authorizing an account using a passphrase that includes audible and inaudible speech segments, in accordance with the techniques of this disclosure. Remote computer 120 may capture audio and video of a spoken phrase by a speaker (610). For example, user 118 may speak a phrase into remote computer 120, such as a smartphone or ATM. Remote computer 120 may process the audio or video recording into acoustic data and visual data and send the acoustic data and visual data representing the spoken phrase by the speaker (620).

Administrator computer 108 may receive the acoustic data and visual data representing the spoken phrase by the speaker (630). Administrator computer 108 may determine, based on the acoustic data and visual data representing the spoken phrase, a pattern of audible and inaudible speech segments of the spoken phrase (640). Administrator computer 108 may process the visual data to extract one or more visual features of the visual data and identify, based on the one or more visual features, a plurality of speech segments of the spoken phrase. For example, administrator computer 108 may analyze visual data of a mouth of user 118 shaping the passphrase and determine the presence or identity of the syllables of the passphrase. Administrator computer 108 may process the acoustic data to extract one or more acoustic features of the acoustic data and identify, based on the one or more acoustic features, a plurality of audible and inaudible speech segments of the plurality of speech segments of the spoken phrase. For example, administrator computer 108 may analyze acoustic data of user 118 reciting the passphrase and determine the presence or identity of the syllables of the passphrase.

In some examples, administrator computer 108 may also analyze linguistic or biometric content of the passphrase. In some examples, administrator computer 108 may determine, based on either or both the acoustic data or the visual data representing the spoken phrase, the plurality of audible or inaudible speech segments of the spoken phrase. For example, administrator computer 108 may determine a linguistic content of each word of the passphrase. In some examples, administrator computer 108 may determine based on at least one of the acoustic data or the visual data representing the spoken phrase, one or more identifying characteristics of the speaker. For example, administrator computer 108, administrator computer 108 may determine a rate of speech, a pitch of speech, or other acoustic characteristics of user 118 that may be used to identify user 118.

Administrator computer 108 may determine, based on the plurality of audible and inaudible speech segments, the pattern of audible and inaudible speech segments. Administrator computer 108 may determine whether the pattern of audible and inaudible speech segments of the spoken phrase matches a pattern of audible and inaudible speech segments of a passphrase (650).

In some examples, administrator computer 108 may also analyze linguistic or biometric content of the passphrase. In some examples, administrator computer 108 may determine whether the plurality of audible or inaudible speech segments of the spoken phrase match a plurality of audible or inaudible speech segments of the passphrase. For example, administrator computer 108 may determine whether the actual syllables of the spoken phrase match the syllables of the passphrase based on the content of the syllables. In some examples, administrator computer 108 may determine whether the one or more identifying characteristics of the speaker match one or more identifying characteristics of a speaker of the passphrase. For example, administrator computer 108 may determine whether the acoustic characteristics of the spoken phrase match the acoustic characteristics of the passphrase.

Administrator computer 108 may authorize the speaker in response to determining that the pattern of audible and inaudible speech segments of the spoken phrase matches the pattern of audible and inaudible speech segments of the passphrase (660). Administrator computer 108 may send a notification of authorization to the speaker (670). Remote computer 120 may receive the notification of authorization to the speaker (680).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
capturing, by a first remote computing device, first acoustic data and first visual data representing a passphrase;
determining, by the first remote computing device and based on the first acoustic data and the first visual data representing the passphrase, a first pattern of audible and inaudible speech segments of one or more words of the passphrase;
receiving, by a centralized computing device and from the first remote computing device, first pattern data representing the first pattern of the audible and inaudible speech segments of the passphrase, wherein the first pattern data includes a parameterized value for each of the audible and inaudible speech segments of the first pattern;
storing, by the centralized computing device and in a database, the first pattern data;
capturing, by a second remote computing device, second acoustic data and second visual data representing a spoken phrase by a speaker;

processing, by the second remote computing device, the second acoustic data to extract one or more acoustic features of the second acoustic data;

processing, by the second remote computing device, the second visual data to extract one or more visual features of the second visual data;

identifying, by the second remote computing device and based on the one or more visual features, a plurality of speech segments of one or more words of the spoken phrase;

identifying and parameterizing, by the second remote computing device and based on the one or more acoustic features and a predetermined audible threshold, one or more speech segments of the plurality of speech segments above the audible threshold as audible speech segments of the spoken phrase and one or more speech segments of the plurality of speech segments below the audible threshold as inaudible speech segments of the spoken phrase, wherein the one or more audible speech segments are different from the one or more inaudible speech segments;

determining, by the second remote computing device and based on an ordered sequence of the parameterized audible and inaudible speech segments, a second pattern of the audible and inaudible speech segments of one or more words of the spoken phrase;

receiving, by the centralized computing device and from the second remote computing device, second pattern data representing the second pattern of the audible and inaudible speech segments of the spoken phrase;

determining, by the centralized computing device and based on the first and second pattern data, that the second pattern of audible and inaudible speech segments of the spoken phrase matches the first pattern of audible and inaudible speech segments of the passphrase; and in response to determining that the second pattern of audible and inaudible speech segments of the spoken phrase matches the first pattern of audible and inaudible speech segments of the passphrase, authorizing, by the centralized computing device, the speaker.

2. The method of claim 1, wherein identifying the plurality of audible and inaudible speech segments from the plurality of speech segments further comprises, for each speech segment of the plurality of speech segments:

identifying, by the second remote computing device, the speech segment as an audible speech segment if the speech segment has a sound pressure measurement greater than or equal to a sound pressure threshold; or identifying, by the second remote computing device, the speech segment as an inaudible speech segment if the speech segment has a sound pressure measurement less than the sound pressure threshold.

3. The method of claim 1, wherein authorizing the speaker further comprises permitting the speaker to access a secure system.

4. The method of claim 3, further comprising, prior to receiving the second pattern data:

receiving, by the centralized computing device and from the second remote computing device, a request from the speaker to access the secure system;

selecting, by the centralized computing device, the passphrase from a plurality of possible passphrases; and sending, by the centralized computing device and to the second remote computing device, an indication of the passphrase.

5. The method of claim 4, wherein the passphrase of the plurality of possible passphrases is randomly selected.

6. The method of claim 1, further comprising:

determining, by the second remote computing device and based on at least one of the second acoustic data or the second visual data representing the spoken phrase, a plurality of audible or inaudible speech segments of the spoken phrase;

receiving, by the centralized computing device and from the second remote computing device, the plurality of audible or inaudible speech segments of the spoken phrase; and determining, by the centralized computing device, that the plurality of audible or inaudible speech segments of the spoken phrase match a plurality of audible or inaudible speech segments of the passphrase, wherein authorizing the speaker is further based on determining that the plurality of audible or inaudible speech segments of the spoken phrase match the plurality of audible or inaudible speech segments of the passphrase.

7. The method of claim 1, further comprising:

determining, by the second remote computing device and based on at least one of the second acoustic data or the second visual data representing the spoken phrase, one or more identifying characteristics of the speaker;

receiving, by the centralized computing device and from the second remote computing device, the one or more identifying characteristics of the speaker; and determining, by the centralized computing device, that the one or more identifying characteristics of the speaker match one or more identifying characteristics of a speaker of the passphrase, wherein authorizing the speaker is further based on determining that the one or more identifying characteristics of the speaker match the one or more identifying characteristics of the speaker of the passphrase.

8. A system comprising:

a plurality of computing devices, each computing device comprising:

a memory; and one or more processors in communication with the memory, and wherein the plurality of computing devices comprises a first remote computing device configured to:

capture first acoustic data and first visual data representing a passphrase; and determine, based on the first acoustic data and the first visual data representing the passphrase, a first pattern of audible and inaudible speech segments of one or more words of the passphrase;

wherein the plurality of computing devices comprises a second remote computing device configured to:

capture second acoustic data and second visual data representing a spoken phrase by a speaker;

process the second acoustic data to extract one or more acoustic features of the second acoustic data;

process the second visual data to extract one or more visual features of the second visual data;

identify, based on the one or more visual features, a plurality of speech segments of one or more words of the spoken phrase;

identify and parameterize, based on the one or more acoustic features and a predetermined audible threshold, one or more speech segments of the plurality of speech segments above the audible threshold as audible speech segments of the spoken phrase and one or more speech segments of the plurality of speech segments below the audible threshold as inaudible speech segments of the spoken phrase, wherein the one or more audible speech segments are different from the one or more inaudible speech segments; and determine, based on an ordered sequence of the parameterized audible and inaudible speech segments, a second pattern of the audible and inaudible speech segments of one or more words of the spoken phrase;

wherein the plurality of computing devices comprises a centralized computing device configured to:

receive, from the first remote computing device, first pattern data representing the first pattern of the audible and inaudible speech segments of the passphrase, wherein the first pattern data includes a parameterized value for each of the audible and inaudible speech segments of the first pattern;

store, in a database, the first pattern data;

receive, from the second remote computing device, second pattern data representing the second pattern of the audible and inaudible speech segments of the spoken phrase;

determine, based on the first and second pattern data, that the second pattern of audible and inaudible speech segments of the spoken phrase matches the first pattern of audible and inaudible speech segments of the passphrase; and in response to determining that the second pattern of audible and inaudible speech segments of the spoken phrase matches the first pattern of audible and inaudible speech segments of the passphrase, authorize the speaker.

9. The system of claim 8, wherein to identify the plurality of audible and inaudible speech segments from the plurality of speech segments, the second remote computing device is configured to, for each speech segment of the plurality of speech segments:

identify the speech segment as an audible speech segment if the speech segment has a sound pressure measurement greater than or equal to a sound pressure threshold; or identify the speech segment as an inaudible speech segment if the speech segment has a sound pressure measurement less than the sound pressure threshold.

10. The system of claim 8, wherein the authorization of the speaker further comprises permitting the speaker access to a secure system.

11. The system of claim 10, wherein the centralized computer is configured to, prior to receiving the second pattern data:

receive, from the second remote computing device, a request from the speaker to access the secure system;

select the passphrase from a plurality of possible passphrases; and send, to the second remote computing device, an indication of the passphrase.

12. The system of claim 8, wherein the second remote computing device is configured to determine, based on at least one of the second acoustic data or the second visual data representing the spoken phrase, a plurality of audible or inaudible speech segments of the spoken phrase;

wherein the centralized computing device is configured to:

receive, from the second remote computing device, the plurality of audible or inaudible speech segments of the spoken phrase; and determine that the plurality of audible or inaudible speech segments of the spoken phrase match a plurality of audible or inaudible speech segments of the passphrase, and wherein the authorization of the speaker is further based on determining that the plurality of audible or inaudible speech segments of the spoken phrase match the plurality of audible or inaudible speech segments of the passphrase.

13. The system of claim 8, wherein the second remote computing device is configured to determine, based on at least one of the second acoustic data or the second visual data representing the spoken phrase, one or more identifying characteristics of the speaker, wherein the centralized computing device is configured to:

receive, from the second remote computing device, the one or more identifying characteristics of the speaker; and determine that the one or more identifying characteristics of the speaker match one or more identifying characteristics of a speaker of the passphrase, and wherein the authorization of the speaker is further based on determining that the one or more identifying characteristics of the speaker match the one or more identifying characteristics of the speaker of the passphrase.

14. A non-transitory computer-readable storage medium having stored thereon instructions that, when executed, cause:

one or more processors of a first remote computing device to:

capture first acoustic data and first visual data representing a passphrase; and determine, based on the first acoustic data and the first visual data representing the passphrase, a first pattern of audible and inaudible speech segments of one or more words of the passphrase;

one or more processors of a second remote computing device to:

capture second acoustic data and second visual data representing a spoken phrase by a speaker;

process the second acoustic data to extract one or more acoustic features of the second acoustic data;

process the second visual data to extract one or more visual features of the second visual data;

identify, based on the one or more visual features, a plurality of speech segments of one or more words of the spoken phrase;

identify and parameterize, based on the one or more acoustic features and a predetermined audible threshold, one or more speech segments of the plurality of speech segments above the audible threshold as audible speech segments of the spoken phrase and one or more speech segments of the plurality of speech segments below the audible threshold as inaudible speech segments of the spoken phrase, wherein the one or more audible speech segments are different from the one or more inaudible speech segments;

determine, based on an ordered sequence of the parameterized audible and inaudible speech segments, a second pattern of the audible and inaudible speech segments of one or more words of the spoken phrase; and one or more processors of a centralized computing device to:

receive, from the first remote computing device, first pattern data representing the first pattern of the audible and inaudible speech segments of the passphrase, wherein the first pattern data includes a parameterized value for each of the audible and inaudible speech segments of the first pattern;

store, in a database, the first pattern data;

receive, from the second remote computing device, second pattern data representing the second pattern of the audible and inaudible speech segments of the spoken phrase;

determine, based on the first and second pattern data, that the second pattern of audible and inaudible speech segments of the spoken phrase matches the first pattern of audible and inaudible speech segments of the passphrase; and in response to determining that the second pattern of audible and inaudible speech segments of the spoken phrase matches the first pattern of audible and inaudible speech segments of the passphrase, authorize the speaker.

15. The method of claim 1, further comprising:

determining, by the first remote computing device and based on the acoustic data and visual data representing the passphrase, the audible threshold; and storing, by the centralized computing device and in the database, the audible threshold as pattern data.

16. The method of claim 1, wherein the one or more speech segments of the plurality of speech segments above the audible threshold are parameterized as a first parameter value, and wherein the one or more speech segments of the plurality of speech segments below the audible threshold are parameterized as a second parameter value, different from the first parameter value.

17. The method of claim 1, wherein the second remote computing device comprises an automated teller machine (ATM).

\* \* \* \* \*